United States Patent [19]

Telbizoff

[11] 3,999,930
[45] Dec. 28, 1976

[54] MOLD ASSEMBLY FOR FORMING AND CURING FLEXIBLE SEALS

[76] Inventor: Louis E. Telbizoff, 12 Buckskin Lane, Rolling Hills, Calif. 90274

[22] Filed: Jan. 13, 1975

[21] Appl. No.: 540,651

Related U.S. Application Data

[60] Continuation of Ser. No. 337,769, March 2, 1973, abandoned, which is a division of Ser. No. 178,249, Sept. 7, 1971, Pat. No. 3,745,204, which is a continuation-in-part of Ser. No. 840,406, July 9, 1969, abandoned.

[52] U.S. Cl. .............................. 425/394; 264/257; 264/320; 264/325
[51] Int. Cl.² ........................................ B29C 1/00
[58] Field of Search .......... 425/383, 389, 390, 392, 425/DIG. 38, 394; 264/257, 325, 320

[56] References Cited
UNITED STATES PATENTS

| | | | |
|---|---|---|---|
| 1,773,138 | 8/1930 | Gammeter | 425/393 |
| 2,361,735 | 10/1944 | Beckwith et al. | 264/257 |
| 2,723,426 | 11/1955 | Pelly | 425/390 |
| 2,838,796 | 6/1958 | Reed | 425/393 |
| 3,041,660 | 7/1962 | Fink | 425/393 |

Primary Examiner—Francis S. Husar
Assistant Examiner—R. J. Charvat

[57] ABSTRACT

A mold assembly, as much as 12 feet long, consists of a strip of material having a cavity extending from end to end, the cavity being smooth walled about its periphery and open at ends and on one side. Curable sheet composite elastomer material faced with a reinforcing sheet is folded around a mandrel leaving free flaps and slid endwise into the cavity. The flaps are then folded on each other over a filler and a cover strip forming a part of the mold is laid over them. This assembly is then loaded endwise into a container of similar length in which is an inflatable bag, the container being located in an oven. The bag is first inflated to press the cover strip against the exterior of the mold assembly and heat is applied to cure the elastomer material. Thereafter the bag is deflated, the mold assembly removed from the container, the elastomer material and mandrel removed endwise from the mold cavity and the mandrel removed from the cured elastomer material to free the cured finished product.

7 Claims, 16 Drawing Figures

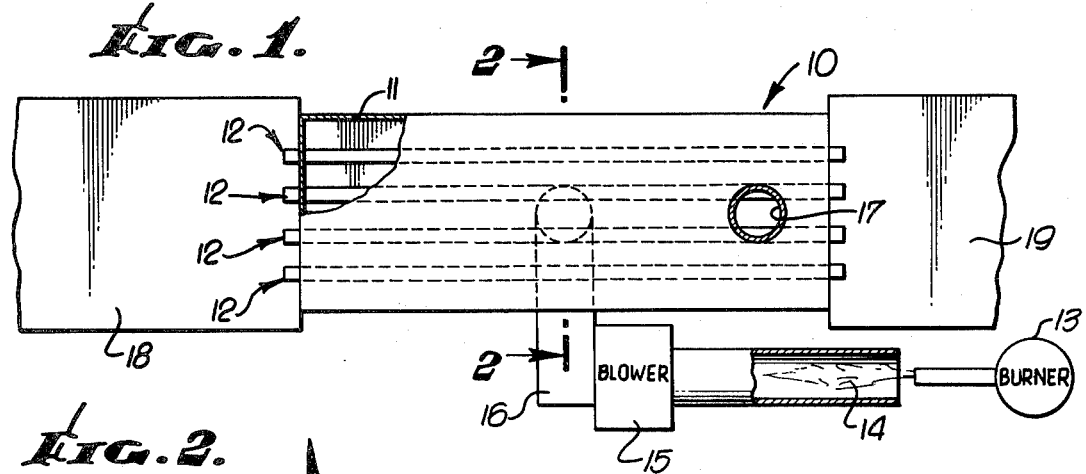
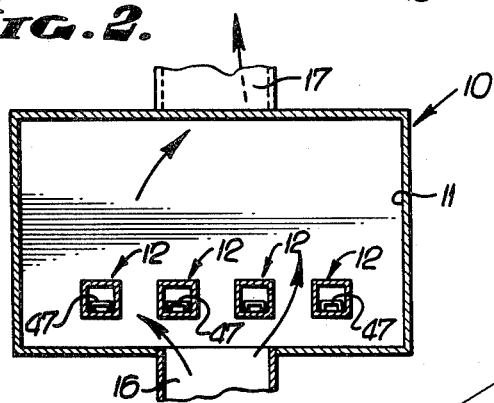
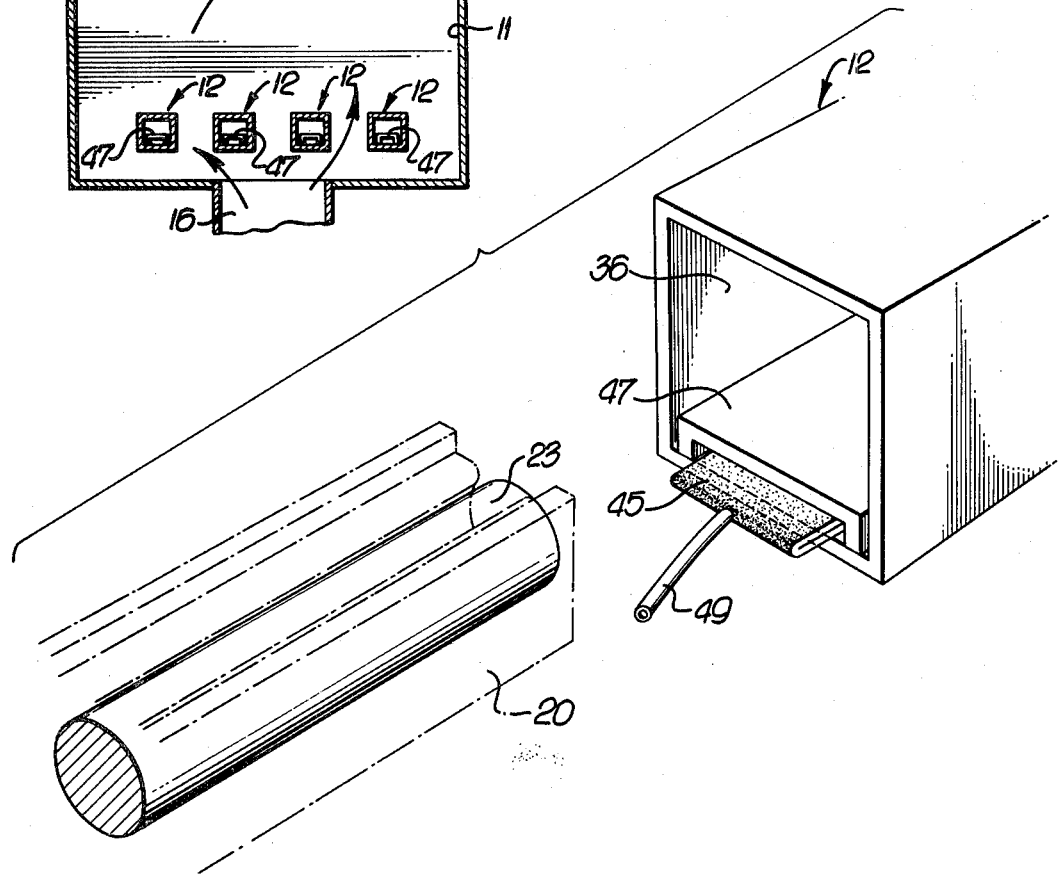

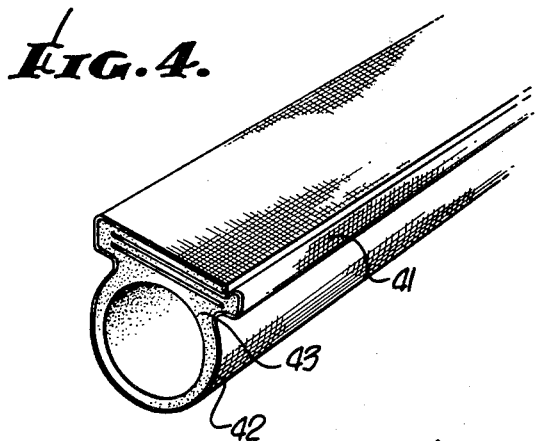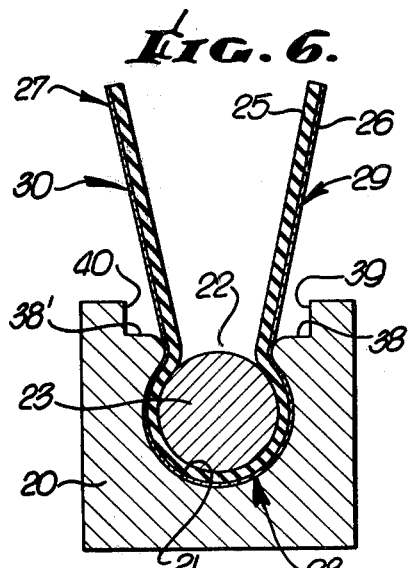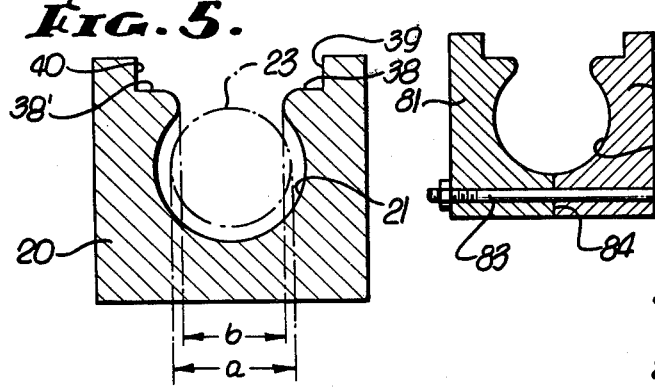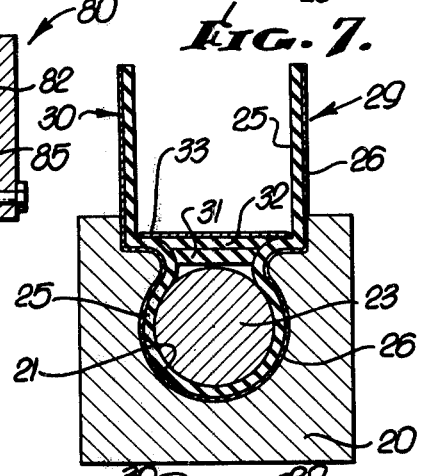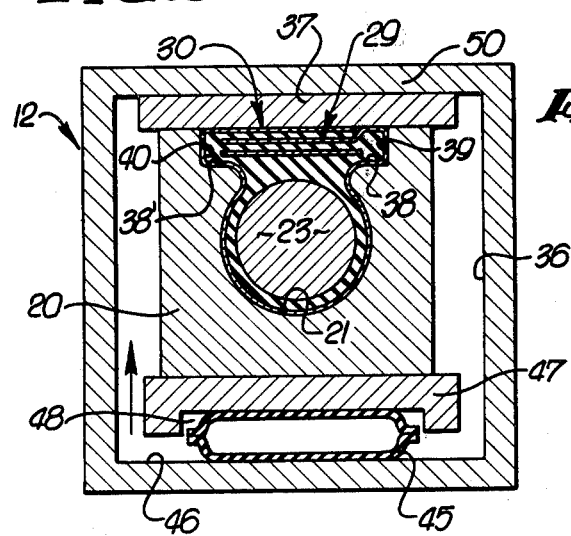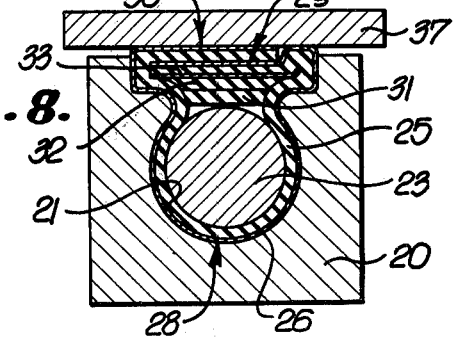

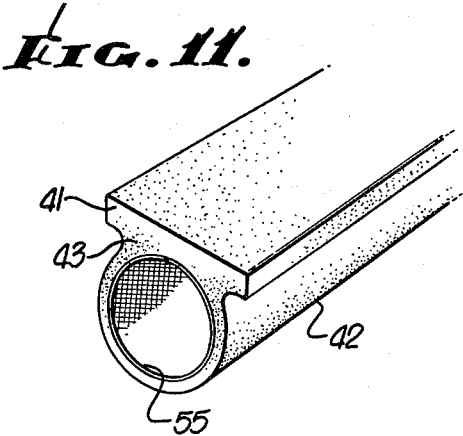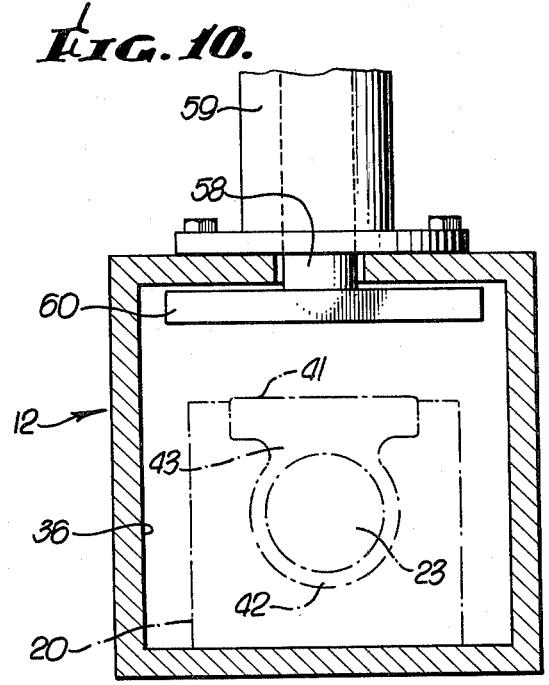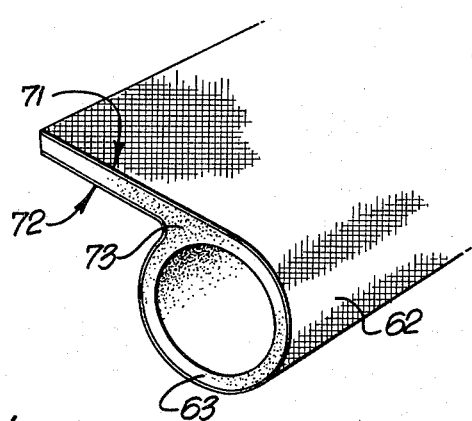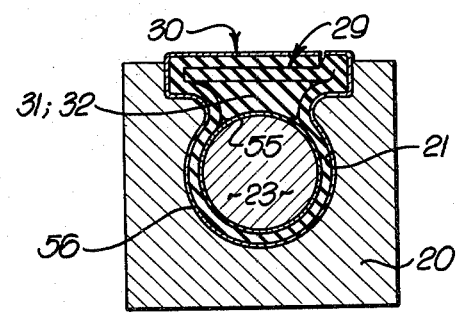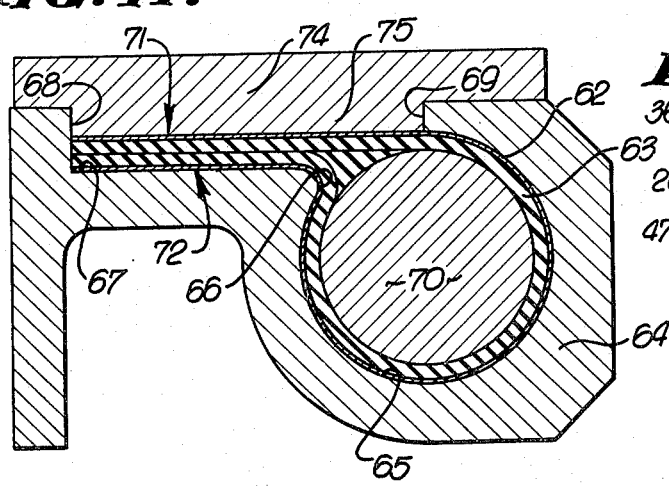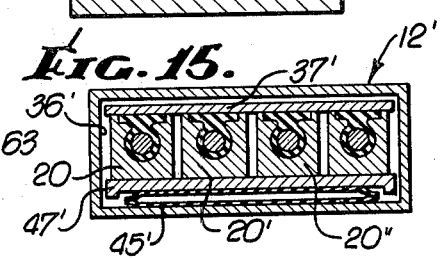

MOLD ASSEMBLY FOR FORMING AND CURING FLEXIBLE SEALS

This is a continuation of application Ser. No. 337,769 filed Mar. 2, 1973, and now abandoned, which application was a division of Ser. No. 178,249, filed Sept. 7, 1971, and now U.S. Pat. No. 3,745,204, which in turn was a continuation-in-part of application Ser. No. 840,406 filed July 9, 1969 and now abandoned.

The making of a long mold strip consisting of a bulb portion on which there is no parting line protrusion and wherein the bulb portion is separated from an attaching section by a connecting section of breadth less than the diameter of the bulb portion, requires a new molding technique not heretofor known or practiced.

In the manufacturing of aircraft seals the practice until now has consisted primarily of what has been commonly called the hot mold process. This process makes use of a segmented mold assembly consisting of numerous parts, which when assembled around a curable body of reinforced elastomer are mounted in an air or hydraulic press in which the elastomer is cured. Of special significance in the practice heretofore prevalent is the fact that parts of the mold are heated and kept heated during the entire working operation. For example, the mold assembly is preheated and the press opened, after which uncured catalyzed reinforced elastomer material which is to comprise the seal is wrapped around a mandrel and then lowered into position in the hot cavity portion of the mold. Cold wedge bars are inserted into the cavity to form one half of the cavity while a recess in the mold forms the other half so that once cured, the mold can be broken open and the cured seal with its mandrel inside of it unloaded from the mold. Force is applied and the wedge bars are closed during the curing process and heat is also applied for a period of time sufficient to cure or vulcanize the elastomer. While the wedges are being removed and the cured object extracted, the mold remains hot. Finally, the mandrel is removed from the cured product and flash, which has been created at the parting lines of the mold, is trimmed off.

The molding methods commonly in use as of this date in the manufacture of strip seals having a substantially rounded hollow body, an attaching section, and a connecting section between the body and the attaching section which is of breadth less than the transverse breadth of the body making an undercut, employ substantially conventional methods and molds. Such molds, which are from 10 to 12 feet long, are made of steel in order to be strong enough, are multiple part molds, and employ wedge strips for holding the multiple parts together and in position around a mandrel, the curable molding material being wrapped around the mandrel and impressed in the multiple part mold, and such molds are on all occasions side-loaded. Molds of the kind made reference to are so heavy that they normally require two men with the aid of mechanical appliances to lift the molds into and out of the press.

The molds used for the process described are handled hot at practically all times, rarely being permitted or capable as a practical matter of cooling between molding operations. On those rare occasions when these molds are allowed to cool, cooling periods and subsequent reheating periods increase the time needed for each molding cycle over that needed when molds are kept hot by about twenty minutes. The time cycle being so long adds greatly to the cost of the finished product.

One of the objectionable and inescapable features of the conventional process just described is the creation of protuberances at the parting line. At the parting line where the wedge bars and base shoe meet the flash occurs. Since there is no feasible way to entirely remove the projection at the parting line, all seals made by this process have to tolerate projections. Although attempts have been made to insert shims to eliminate such parting lines, the employment of shims is only moderately effective in that although reducing the prominence of a single parting line projection on each side, the shims simultaneously create two additional parting lines and, in most conventional molds, this means the creation of four projections on the finished product rather than two. An additional difficulty is that shims are apt to slip out of place.

Another difficulty inherent in the conventional hot mold process, in addition to the problems of personnel handling hot metal, is that the instant the uncured elastomer already loaded with a catalyzing agent comes into contact with any of the hot parts of the mold, curing commences immediately and operators are confronted with the need of using considerable haste in order to place the wedges in proper position in the mold, then apply a top plate and finally subject the multiple part assembly to action of the hydraulic or pneumatic press while the heating cycle progresses.

Although attempts have been made to make use of a cold mold process, the procedure is extremely time consuming in that adequate time must be permitted to elapse after the hot mold is extracted from the curing cycle and stripped of its molded product before it can be used to accept a new catalized uncured product. Application of wedge bars in adequate number is equally time consuming as has been described in the foregoing method and then after assembly, an appreciable time is needed to bring the assembly up to curing temperature. It is apparent therefore that there are two periods of appreciable lost time which, in the current state of economy, is wasteful and expensive. Moreover, molds of the type made use of in these conventional processes cost on the average about 1,000 dollars each, the cost being such that it is impractical and unfeasible to have large quantities of individual molds waiting to be made use of.

Although in the conventional practice the mold is designed to locate the flash line where it will be least likely to affect the sealing characteristics, flash lines that cannot be controlled, as in the case in some molded forms, and as a consequence are in the sealing area, not only interfere with the sealing capabilities of the product but also wear prematurely because of a sliding effect on the flash line. Moreover, seals with a flash line at any location, such as all present must have, when made by the conventional hot mold method, have reduced flexibility life. Still further, because of the sliding and wedging action of the wedges or segmented molds, wall thicknesses of the resulting product vary causing a reduction in stiffness and flexibility on occasion and a reduction in the ability to assure a proper seal. Seals which are produced by the process making use of shims are often unreliable in that the shims frequently shift in position creating areas of reduced thickness at some locations and increased thickness at other locations, thus minimizing the uniform reliability of the product.

Attention is called to certain representative prior patents as follows: U.S. Pat. Nos. to Beckwith 2,361,735; Bastian 1,520,996; Gustafson 1,665,355; and Grove 266,810.

It is therefore among the objects of the invention to provide a new and improved mold assembly and curing system for the making and curing of seals of such type and character as to be especially useful as an aircraft type seal.

Another object of the invention is to produce a new and improved reinforced elastomer seal which is entirely without parting lines in the effective bulb or body area.

Another object of the invention is to provide a new and improved mold and system of molding which avoids the use of segmented movable parts in the bulb or body area of the product, thereby eliminating parting lines.

Still further among the objects of the invention is to provide a new and improved mold assembly and system of molding which is completely cold while being loaded and which can be quickly brought to a proper condition of pressure and curing temperature, the molds themselves being so inexpensive that multiples of them can be kept on hand for continuous use in a production line.

Still another object of the invention is to produce seals that are curved in a plurality of planes.

Still further among the objects of the invention is to provide a new and improved mold and system of using the mold for the manufacture of seals having a bulb area wherein the seal can include reinforcement on either the inside or the outside or embedded, without strike through and wherein, except for the mandrel located within the bulb portion of the seal, the mold assembly consists of virtually a single part, capable of producing a seal wherein there is no parting line at the effective bulb or body area.

With these and other objects in view, the invention consists in the construction, arrangement, and combination of the various parts of the device and method, whereby the objects contemplated are attained, as hereinafter set forth, pointed out in the appended claims and illustrated in the accompanying drawings.

In the drawings:

FIG. 1 is a schematic view showing a typical oven in which the mold assembly is to be positioned while curing takes place, together with a loading and unloading table.

FIG. 2 is a cross-sectional view on the line 2—2 of FIG. 1.

FIG. 3 is a fragmentary exploded end perspective view of a container for housing the mold assembly with the mold assembly shown partly in broken lines in the position it would occupy before being slid endwise into the container.

FIG. 4 is a side perspective view of one form of seal capable of being made by the mold and system of molding.

FIG. 5 is a cross-sectional view of the mold cavity member in which the seal of FIG. 4 is made and cured.

FIG. 6 is a cross-sectional view showing one of the initial steps in the molding system.

FIG. 7 is a cross-sectional view showing one of the steps following the step of FIG. 6.

FIG. 8 is a cross-sectional view showing the condition of the material in the mold just before insertion into an appropriate container.

FIG. 9 is a cross-sectional view of a mold assembly showing the mold assembly and elastomer material in position in a container equipped to apply pressure to the mold and parts therein while being subjected to a heating cycle for curing purposes.

FIG. 10 is a cross-sectional view showing a means of applying pressure different from that shown in FIG. 9.

FIG. 11 is a side perspective view of what is commonly termed a track and bulb seal similar to the seal of FIG. 4, but wherein the reinforcing material is on the interior rather than the exterior.

FIG. 12 is a cross-sectional view similar to FIG. 8, but loaded for the fabrication and curing of a seal of the type shown in FIG. 11.

FIG. 13 is a side perspective view of another form commonly termed a P-bulb seal.

FIG. 14 is a cross-sectional view of a mold assembly of the type suited to produce and cure the P-bulb seal of FIG. 13.

FIG. 15 is a cross-sectional view of a multiple chamber member.

FIG. 16 is a cross-sectional view of a mold cavity member constructed of separate pieces.

A seal consists of effective body or bulb section, an attachment section and a connecting section between them.

Of special importance in applicant's device is to be able to form such a work piece in which the connecting section between the two is of reduced diameter, smaller than the diameter of bulb section, and therefor smaller in diameter than the mandrel.

It is not possible to produce such a work piece in a system like that employed by conventional dies where the die having the die cavity must be loaded from the top. To accomplish this the disclosure provides for loading endwise as a step in the molding and curing system. To accomplish this the sheet material when folded around the mandrel must occupy no more space than a neat clearance between the mandrel and the wall of the die cavity when the mandrel is in place, since otherwise the work piece and mandrel could not be slid endwise into the long mold cavity.

The normal direction of extraction of molded objects from conventional dies is upwardly through the long opening on one side of the mold cavity in the mold cavity member. When extra material is softened and forced to flow to the corners of the molded object, this results in excessive pressure on the inside wall of the die cavity and the resulting friction is too prohibitively great to permit withdrawing the product endwise out of the mold cavity.

In an embodiment of the invention chosen for the purpose of illustration there is shown in FIG. 1 a curing oven 10 having a chamber 11 to accommodate, for example, four chamber elements 12. The oven is provided with a burner 13 for sending hot gases 14 to a blower 15 from which the hot gases are forced through an inlet 16 into the chamber 11 and from which the spent gases pass outwardly through an outlet 17, commonly to be recirculated. A loading table 18 is provided at an entrance end of the oven 10 and, if desired, an unloading table 19 can be provided at the opposite end whereby to streamline the system. Although a gas system has been described as an effective means for producing the necessary heat, other heating means such as electric or circulating hot fluid may also be used.

For making and curing the bulb type of seal such as that illustrated in FIGS. 4 and 11, there is provided a mold cavity member 20 which commonly may be an aluminum extrusion in which is formed a substantially circular mold cavity 21. Along one side of the mold cavity 21 is an opening 22 having a breadth appreciably less than the diameter of the mold cavity 21 and also of breadth less than the diameter of the mandrel 23 which is used in the mold. For example, the diameter *a* of the mandrel 23, as shown in FIG. 5, is greater than the breadth *b* of the opening 22 by an amount such that the mandrel must be inserted endwise into the cavity 21 when it is to be used. Instead of an extrusion, the mold cavity element may be otherwise made as by casting, machining, or chemically milling, and may be metallic or nonmetallic. Further, the mandrel may be metallic or nonmetallic and rigid or flexible. Where the body of the seal is solid, elastomer is used to fill the area otherwise occupied by the mandrel. Although the mold cavity member 20 is essentially a single piece of material, it may on occasions be made of separate parts 81 and 82 as shown in FIG. 16, bolted together by bolts 83 so as to form essentially an integral member, with the material adjacent a joint 84 made perfectly smooth to avoid a flash at this point.

In making use of the mold cavity member 20 and mandrel 23 an elastomeric material 25 is selected, used without reinforcement or to which is applied a reinforcing material 26. Various elastomeric materials are suitable, but whichever is selected must be one capable of being cured by application of heat when an appropriate catalyst is mixed with the elastomeric material which does not become active at normal temperatures. Some typical elastomeric materials are rubber, either natural or synthetic, silicone and fluorosilicone rubber, neoprene, and fluorocarbon rubber. The reinforcing may be a knit fabric or woven fabric depending usually on the ultimate use, the material of the fabric being some one or another of the current synthetic fabrics, such as Nylon, Dacron or Nomex, and on occasion glass fiber, although reinforcing materials need not necessarily be limited to materials of the specific examples herein suggested. Woven fabrics and knit fabrics having because of their nature distinct properties of usefulness may be replaced on occasions by fibers in other form or sometimes combinations of different forms. Some seals also utilize stiffeners of either metallic or nonmetallic materials.

When the reinforcing is to be on the exterior, a composite sheet 27, which in the example of FIG. 6, is folded around the mandrel 23 with the reinforcing material 26 on the outside and the elastomeric material 25 on the inside in contact with the mandrel. A section 28 of the sheet 27 is folded around the mandrel leaving two free flaps 29 and 30.

With the mandrel 23 partially enveloped by the composite sheet 27, the mandrel is slid endwise into the mold cavity 21 while the flaps 29 and 30 are guided along the opening 22 until the mandrel and the sheet 27 extend throughout the full length of the mold cavity member 20 which, on numerous occasions, is about 12 feet long but which can be longer or shorter.

For making up the form of the seal there are provided filler strips 31 and 32 of breadth sufficient to fill the remaining space in the opening 22 between bases of the flaps 29 and 30, one or both of the filler strips being provided, if desired, with an optional rigid reinforcing material 33. The flaps 29 and 30 are then trimmed if need be to proper breadth and then folded over as shown in FIG. 8, the flap 29 being folded upon the filler strip 32 and the flap 30 being then folded into overlapping position with respect to the flap 29 and the filler strips.

To ultimately accommodate the mold cavity member 20 loaded as described in FIG. 8, there is provided in the oven 10 the chamber element 12 of comparable length which has within it a space 36 having a height and breadth somewhat larger than the mold cavity member 20 to comfortably accommodate the mold cavity member and its appurtenances.

For the purpose of supplying force during the curing operation, an elongated bag 45 is made use of. In the chosen embodiment the bag 45 rests on a bottom wall 46 of the space 36 and may be confined by a slide shoe 47 on the underside of which is a recess 48 to confine the bag 45.

After a cover 37 is applied over the top of the mold cavity member 20 in a position overlying the flaps and filler strips a force is applied in the chamber element 12 causing them to be pressed against shoulders 38 and 38' on respectively opposite sides within walls 39 and 40 to form a molding pocket capable of forming a track section 41 on the finished seal strip as shown in FIG. 4 separated from a bulb section 42 by a connecting section 43.

The assembly, as shown in FIG. 8 and including the cover 37, thus made up, usually on the table 18, is then slid into the chamber element 12 in the oven 10. One or more of the assemblies may be cured all at one time in the oven. For effectiveness in operation, however, one assembly may be inserted into space 36 at a time periodically progressing from one side across the battery of four assemblies at different time intervals with the curing time gauged so that when the operation is ready to remove the first applied assembly in a fully cured condition, a curing time is building up on the other assemblies progressively so that after the assembly which has been removed is replaced by a new assembly with an uncured sheet, the next succeeding assembly has reached a cured state and can then be removed. Although a battery of only four assemblies has been shown, the system is such that virtually any convenient number of assemblies can be worked at one time either by increasing the number across the width of the oven or additionally by inserting them in multiple tiers.

After a mold assembly has been inserted as discussed in the oven, gas or other fluid under high pressure is injected into the bag 45 through a supply tube 49 and the bag inflated. Inflation uniformly through the length of the shoe 47 forces the mold cavity 20 upwardly against the cover 37 which bears against a top wall 50 of the space 36, thereby to create pressure on the flaps 29 and 30 and filler strips 31 and 32 and body or bulb area while the heating and curing is taking place. Upon completion of the curing cycle, the bag 45 is deflated, releasing pressure on the sheet which has now been cured, and permitting removal of the mold cavity member 20 from the chamber 12. If cooling is to be done it is at this stage. The cover 37 is then removed, exposing the now cured flaps. With the reinforcing material 26 in the form of a fabric reinforcement on the exterior, frictional engagement between the exterior of the cured molded form and the wall of the mold cavity 21 is relatively low, permitting the cured molded form to be ejected endwise from the mold cavity member 20. Once clear of the mold cavity member, force of the bulb or body section 42 upon the mandrel 23 is relieved and the mandrel can be pushed endwise from the hollow interior of the bulb section after which the center bulb section is complete.

Occasions may require the production of a center bulb section like that shown in FIG. 11 wherein a reinforcing material 55 is needed on the interior or embedded portion of the body section 42. There is considerable frictional effect between the exterior of the bulb section and the wall of the mold cavity 21. To improve the ease of inserting and then extracting the sealing strip after its final cure from the mold cavity, the exterior of the bulb section and also exterior portions of the flaps 29 and 30 are covered with a very thin film which may have a thickness of approximately 0.002 inches. The plastic film 56 is applied initially prior to insertion of the mandrel wrapped with the sheet material into the mold cavity. Presence of the plastic film reduces the friction and facilitates sliding of the sheet material into the mold. The plastic film is one selected so as to be unaffected by the heat of curing so that it remains in position to facilitate sliding the then cured sheet endwise out of the mold cavity 21 after extraction of the mold cavity members from the chamber element. Once the cured sealing strip has been removed from the mold cavity member 20 the plastic film 56 is stripped off and discarded, the mandrel slid from the interior of the bulb section and a sealing strip like that of FIG. 11 is then ready for use. Although a plastic film has been made reference to a metallic foil or other comparable film may be used.

Although an inflatable bag, like the bag 45, has been described as an effective means for producing the necessary force in the space 36, other force means may also be employed as illustrated in FIG. 10 by making use of a series of pneumatic or hydraulic pistons 58 housed in a corresponding number of cylinders 59, portions of which are shown in FIG. 10, the pistons being attached to a common upper plate 60, applicable to the mold cavity member and the sheet contained therein. In an arrangement like that shown in FIG. 10, a shoe, like the shoe 47 and bag 45 can be dispensed with.

The system is equally well adapted to other forms of mold strips such for example as the P-bulb type of strip shown in FIG. 13, wherein for example reinforcing material 62 is again on the outside of an elastomeric material 63. To make the sealing strip last described, use is made of a mold cavity member 64 having a mold cavity 65 which is uninterruptedly and continuously smooth throughout its entire circumference as is also the case of the mold cavity 21 in the mold cavity member 20. Here also there is provided an opening 66 running lengthwise of the mold cavity. On one side of the opening 66 is a relatively wide shoulder 67 with a wall 68 at one end. A wall 69 defines the opposite side of the opening 66.

In this form of the system a mandrel 70 is used in the same manner as previously described by having the elastomeric material 63 folded around it so as to provide free flaps 71 and 72 which are slid endwise through the opening 66 when the mandrel 70 and accompanying portion of the elastomeric material and reinforcing material are slid endwise into the mold cavity 65. A filler 73 is applied at the location shown and the flaps brought into position in face-to-face overlapping engagement as shown in FIG. 14.

A cover 74 is made use of in this form of the system provided as shown with a section 75 fitting snugly between the walls 68 and 69 and adapted to project downwardly to bring pressure against the flaps 71 and 72. Once assmbled as shown in FIG. 14, the mold cavity member 64 with its cover 74 is inserted endwise into the same chamber element 12 previously described within which it is subjected simultaneously to pressure exerted by inflation of the bag 45 and heat generated in the oven 10 for curing the elastomeric material. Upon completion, as previously described, the bag is deflated, the mold cavity member 64 and cover 74 removed thereby to relieve pressure on the now cured elastomer after which the elastomer and mandrel are ejected endwise from the mold cavity 65 and the mandrel 70 subsequently removed to produce the finished P-bulb sealing strip shown in FIG. 13.

In the embodiment of FIG. 15 there is a single chamber element 12' having the chamber 36' adapted to receive a multiple number of mold cavity members 20, 20' and 20''. A single slide shoe 47' and a large bag 45' accommodates the multiple number of mold cavity members 20, 20' and 20''.

Although the mold cavity member in each instance is heated to curing temperature, while in the oven 10, once removed, being relatively light in cross-section, cooling takes place in air or by submersing in liquid with appreciable promptness sufficient to permit the cover to be separated by hand and the molded reinforced elastomeric material likewise extracted by hand. The mold cavity members consisting of extrusion on some occasions or comparable material properly formed on other occasions have relatively little mass and an appreciable exposed area which permits rapid cooling so that they can be completely loaded in a cold condition on the loading table and then placed in the container in the oven. Molds are so simple and inexpensive that substantial quantities of them can be kept on hand and virtually any number of cold fresh mold cavity members are available for loading with the reinforced elastomeric material and then placed in the oven for curing while the next cold mold cavity member is being made ready. The chamber element 12, remaining in the oven 10, stays hot but the mold cavity member when extracted from it, quickly cools. Of special consequence is the fact that the entire interior of the mold cavity 21, for example, is completely and entirely smooth throughout its entire circumference and this smooth condition carries over around the rounded edges of the opening 22 and thence over the shoulders 38, 38' and walls 39, 40, thereby completely eliminating any elongated obstructions such as are normally caused by the flash line at the parting sections of conventional molds. In Applicant's strip seal the effective body or bulb section is completely devoid of any protrusions or projection of any kind and smooth throughout. The elastomeric material, moreover, is of sufficient firmness so that once the mandrel 23 is inserted and the mandrel wrapped with the sheet inserted into the mold cavity, there is no prospect of the mandrel shifting in position, and accordingly the wall thickness of the effective body or bulb section 42 is completely uniform with no elastomeric strike through the reinforcement.

Although the mold cavity member has been described as a single piece of material for practical and economic reasons, a mold cavity member 80 may be constructed of two parts 81 and 82, as shown in FIG.

16, bolted together by bolts 83 to act as a single piece. A junction 84 of opposite parts in the mold cavity 85 is milled or otherwise made perfectly smooth at the junction to avoid creation of any flash.

When high speed handling without gloves is advantageous the mold of the process herein described can be cooled readily and quickly either in air or by a momentary quenching in water bringing them to a temperature low enough to be handled by hand without need for hands being covered with gloves. Molds of the foregoing process are always loaded cold at the point that no curing commences until the molds are actually placed within an appropriate curing oven. The loaded molds are sufficiently light in weight so that they can be lifted and handled in completely assembled form by a single person, frequently a female worker, the cost of molds of the type described being so relatively low that virtually dozens of them can be kept on hand and loaded ready for curing in multiple lots at only a small fraction of the cost of molds of conventional kinds which are devoted to the manufacture of the same general type of strip seals which still possess the objectionable flash line protrusions.

Having described the invention, what is claimed as new in support of Letters Patent is:

1. A mold assembly for the forming and curing of a flexible seal having a substantially hollow body, an attachment section and a connecting section therebetween extending throughout the length of the seal and of breadth less than the transverse breadth of said body, said mold assembly comprising a mold cavity member having a cavity conforming in shape and size to the body of said seal, said mold cavity member having side elements forming an opening on one side only of said cavity extending from end to end and a wall portion adjacent each side element, said opening being of uniform breadth less than the greatest transverse breadth of said cavity, said cavity having an uninterrupted continuous smooth interior around the entire interior wall surface from one side of said opening to the other whereby to provide a smooth exterior surface for the entire body free of any parting line, said cavity having substantially the same cross sectional shape and size from one end to the other, a mandrel within the body of said seal when said body is in the cavity, said mandrel having a fixed cross sectional shape and size, the greatest transverse dimension of the mandrel being greater than the breadth of said opening, a cover for said opening having a breadth greater than the breadth of said opening, whereby to overlie the sides of said opening at a location spaced from the opening and adapted to rest on said wall portions, said cover having a length substantially equal to the length of said opening, a chamber element providing a space for said mold assembly and having a wall structure surrounding said mold assembly, force means in said space in the area of said mold assembly, said force means being of uniform structure and operative effect on said mold cavity member and said cover throughout the length of the chamber and being adapted to maintain uniform pressure on said mold assembly while said mold assembly and said seal are being subjected to heat during a curing cycle.

2. A mold assembly according to claim 1 wherein there is a laterally open recess on the side of said opening exterior relative to the mold cavity for reception of a portion of the seal.

3. A mold assembly according to claim 1 wherein said force means is an inflatable bag extending longitudinally over the area of said mold assembly and has an operative position located between the mold assembly and a wall structure of said chamber element.

4. A mold assembly according to claim 1 wherein said force means is a series of spaced rams extending through the wall structure of said chamber element into engagement with said mold cavity member.

5. A mold assembly according to claim 1 wherein there is a heated curing space receptive of said entire mold assembly and a feed table at one end of said heated curing space.

6. A mold assembly according to claim 5 wherein there is a discharge table at the end of said curing space opposite said feed table.

7. A mold assembly according to claim 1 wherein said cavity is open at both ends.

* * * * *